July 26, 1960
L. D. HENRY
2,946,644
MEANS FOR SENSING AND TABULATING THE ACCUMULATED
ROUGHNESS OF A ROADWAY SURFACE
Filed June 18, 1959
3 Sheets-Sheet 1
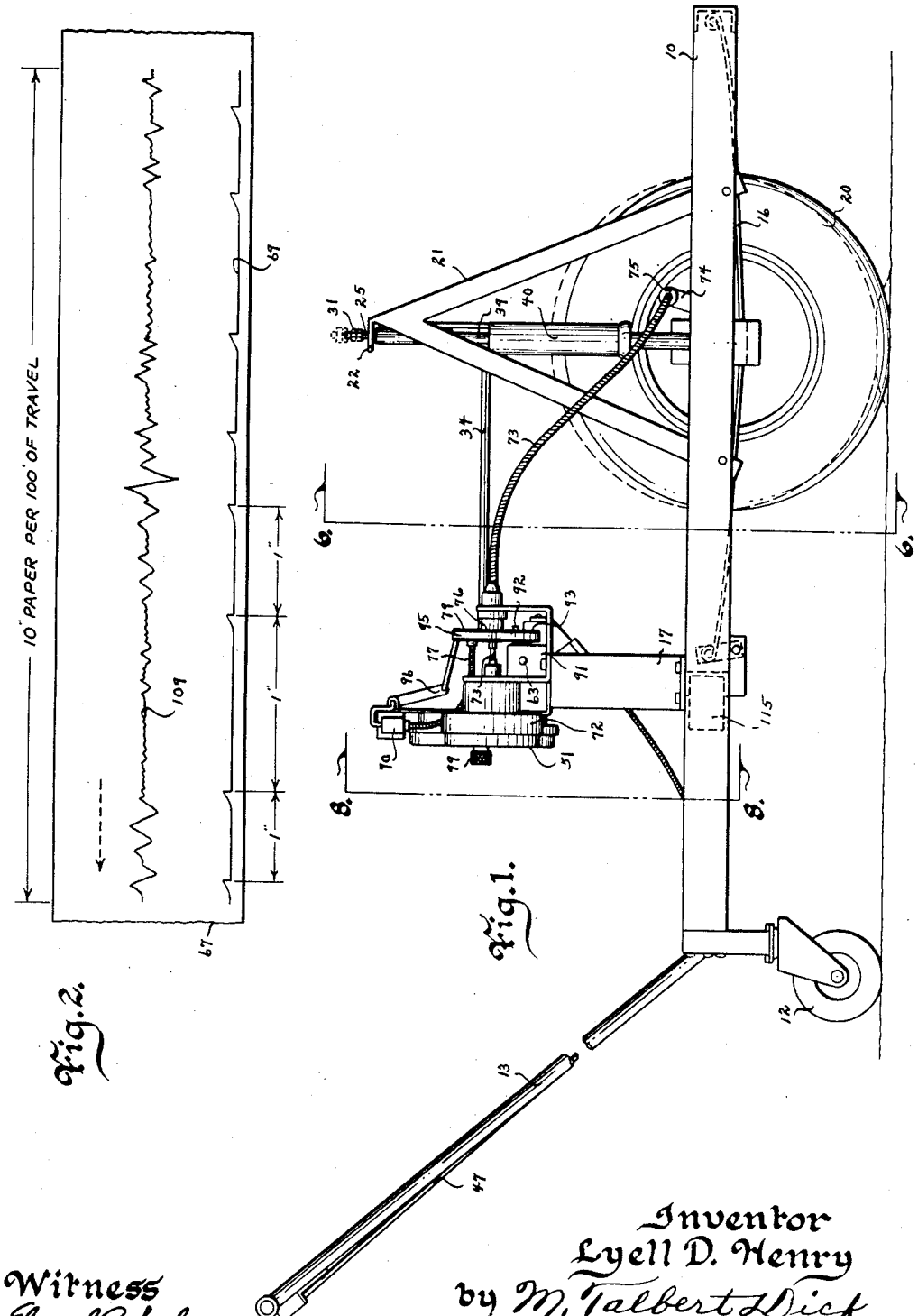
Witness
Edward P. Seeley
Inventor
Lyell D. Henry
by M. Talbert Dick
Attorney

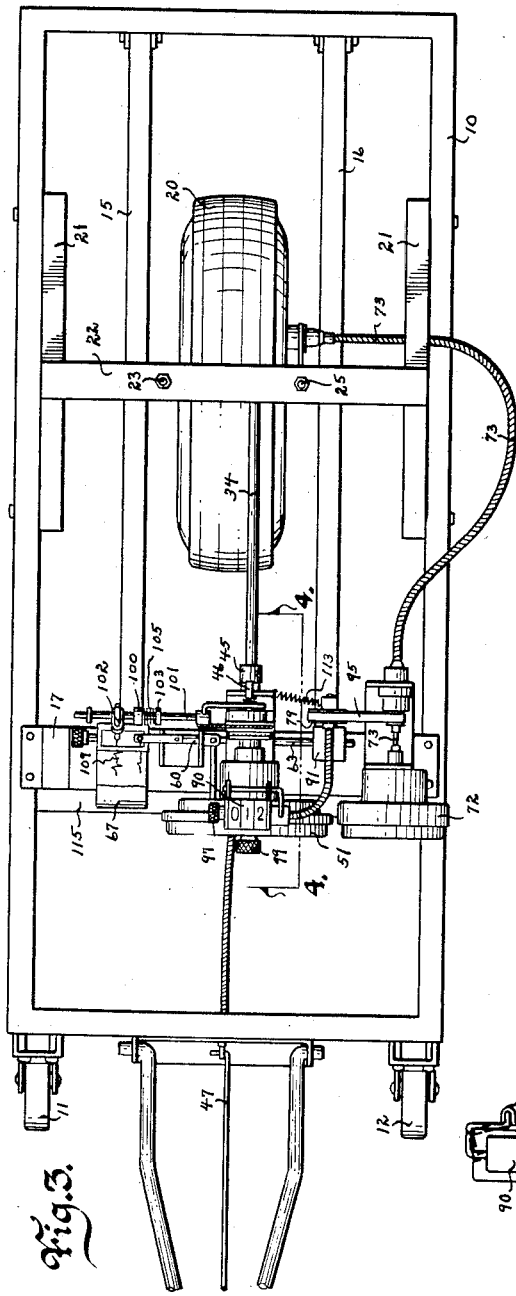
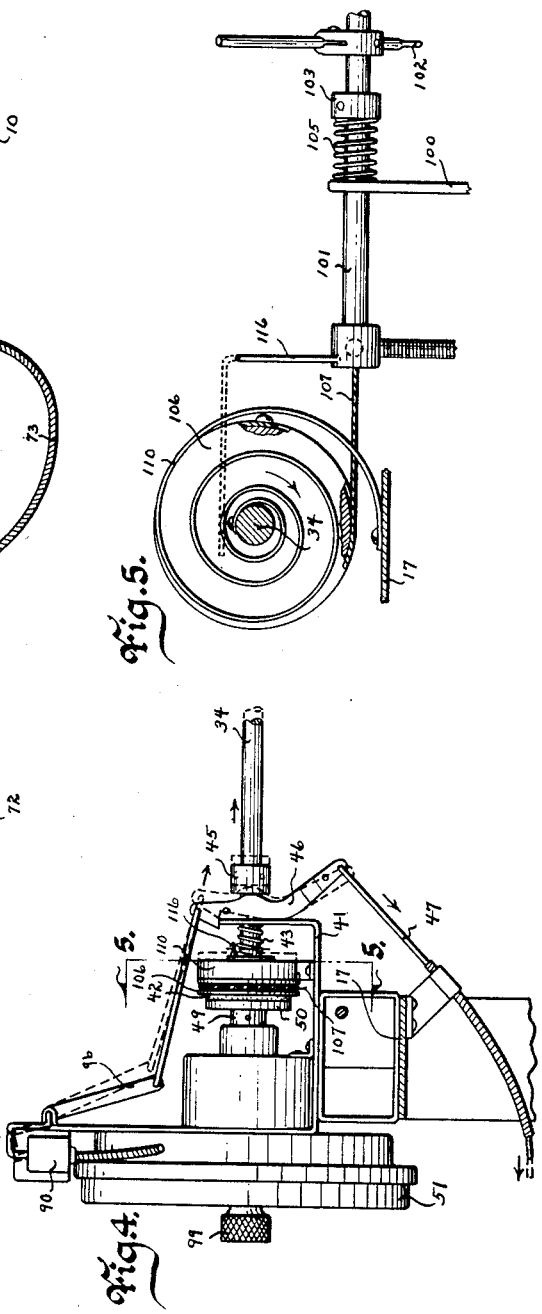
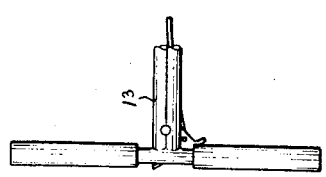

July 26, 1960

L. D. HENRY 2,946,644

MEANS FOR SENSING AND TABULATING THE ACCUMULATED
ROUGHNESS OF A ROADWAY SURFACE

Filed June 18, 1959

Inventor
Lyell D. Henry
by M. Talbert Dief
Attorney

Witness
Edward P. Seeley

United States Patent Office 2,946,644
Patented July 26, 1960

2,946,644

MEANS FOR SENSING AND TABULATING THE ACCUMULATED ROUGHNESS OF A ROADWAY SURFACE

Lyell D. Henry, 2234 Knapp St., Ames, Iowa

Filed June 18, 1959, Ser. No. 821,276

11 Claims. (Cl. 346—13)

This invention relates to the method of and means for sensing, recording and tabulating the roughness of a surface for a given distance and more particularly to a lightweight portable device capable of indicating the roughness of a vehicle roadway or like.

One of the most difficult tasks is to determine the surface condition of concrete or black top roads. Obviously, if a roadway has a surface that is rougher than standard, the road is objectionable both from a shortened useful life and possible damage to the vehicles moving over the roadway. Furthermore, a rough road surface is most uncomfortable to the passengers of the vehicle and in many instances the roughness of the road surface has caused the vehicle to go out of control and result in both loss of life and property damage.

The measurement of roads on a relative basis has resulted in the establishment of a code roughness index at a certain set of specified constants. The roughness index normally is in terms of inches per mile. The measurement is always only in one direction, i.e., only up or only down. Thus, the accumulated inches made up of small increments and even larger jumps, while ignoring the reverse down strokes, will over a given distance give the roughness index for that distance. In general, it has been established that in one mile the number of inches of roughness for black top roads should not be over sixty inches and not over ninety inches for Portland cement roads.

Attempts have been made heretofore to measure the roughness of road surfaces. Such machines are most large and expensive and must be power moved down the highway. Any machine, however, for measuring roughness and tabulating it must use the system of "Center of Percussion" i.e., the upwardly or downwardly movement of a feeler wheel relative to the chassis upon which the wheel is mounted for such up and down reactions. This principle may be demonstrated by placing a pencil and snapping one end with one's finger thereby causing the pencil to spin. It will be noted that the axis of rotation will be approximately at the two-thirds point. If the pencil is snapped at the two-thirds point the pencil will rotate about its far end. Therefore this phenomenon can be shown by formula and in such testing machines effort has been made in general to place two-thirds of the distance and the mass between the sensing wheel and the chassis hitch. Any machine will vary with the speed of movement of the machine, the tire pressure, the strength of the springs, etc. Nevertheless, if a set of constants is chosen for these variables, the ups and downs of the sensing wheel relative to the frame may be measured and recorded and interpreted. One of the objections to the large complicated machines herebefore referred to is that due to their weight, they cannot be drawn down a newly laid roadway that has not yet completely hardened and solidified. Obviously, it is highly desirable to check the roadway as soon as possible and before the same has completely hardened. These large machines herebefore have been objectionably complicated and especially as to the mechanism of their integrator which sums up the amount of roughness. These integrators usually consist of sixteen ball bearings operating in sloping racks. Some effort has been made to produce an electronic counter but the electric contact on the tripping cam and which is designated as one inch, may start at the extreme measurement thereof and thus would be off one inch as registered at the start. This is one of the reasons that large machines are not efficient for measuring short distances of highway and in most instances it is highly necessary to obtain data on such short distances.

Therefore one of the principal objects of my invention is to provide a machine for indicating the roughness of a road surface that is economical in manufacture and use.

A still further object of this invention is to provide a portable lightweight machine that may be used over a road surface that has just recently been laid and before the same has completely hardened.

A further object of this invention is to provide a roadway roughness sensing machine that has its instruments and controls at a distance from the sensing wheel and adjacent its hitch thereby eliminating considerable counterbalancing weight in locating the center of percussion through the wheel axle.

A still further object of this invention is to provide a surface sensing machine that permits the location of the integrator and instruments to be located in a low hung position thereby permitting the return spring of the device to pull in a direction that will aid the wheel springs and not adversely pull against the lightly loaded and sensitive springs of the sensing wheel.

A still further object of this invention is to provide a roadway surface sensing machine that employs a crossbar above the sensing wheel for actuating the integrator whereby the movement of the total wheel will be realized rather than obtained from one side or the other of the wheel.

A still further object of this invention is to provide a machine that permits the starting and stopping of the machine with most accurate measurements.

Still further objects of my invention are to provide a surface sensing machine that is easily operated and durable.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of my device in use;

Fig. 2 is a plan view of a strip of paper upon which the roughness of a surface has been recorded;

Fig. 3 is a top plan view of my machine and more fully illustrates its construction;

Fig. 4 is an enlarged side view of the integrator portion of the machine taken on line 4—4 of Fig. 3;

Fig. 5 is an enlarged cross sectional view of the spiral spring linkage and is taken on line 5—5 of Fig. 4;

Figure 6:
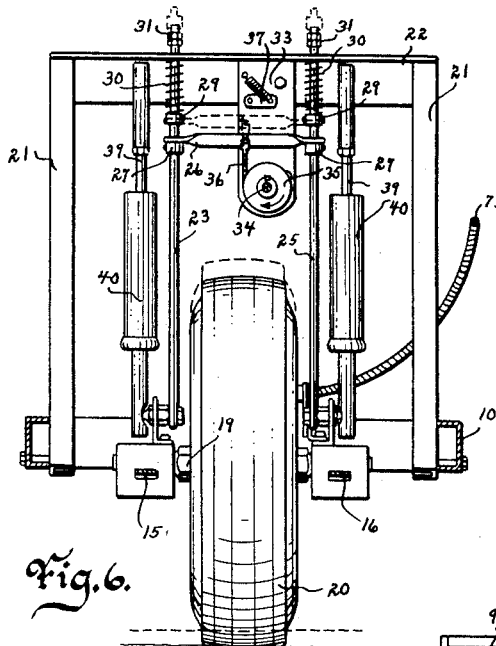
Fig. 6 is a cross sectional view of the device taken on line 6—6 of Fig. 1.
Figure 7:
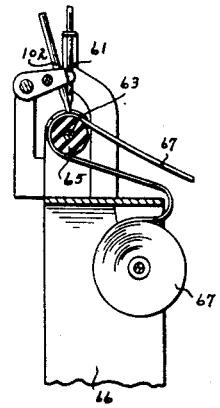
Fig. 7 is an enlarged view of the recording mechanism and is taken on line 7—7 of Fig. 8.
Figure 8:
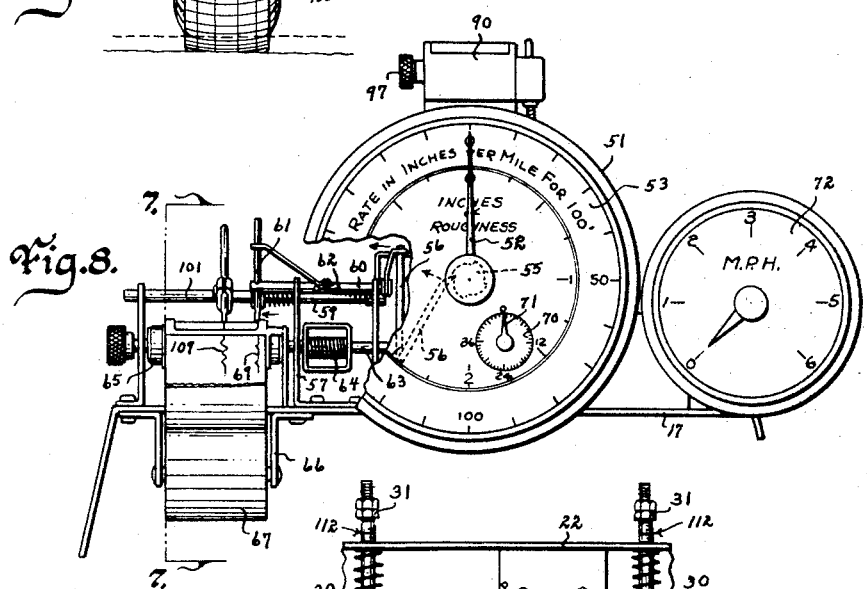
Fig. 8 is an enlarged rear view of the instruments and is taken from line 8—8 of Fig. 1.

In these drawings I have used the numeral 10 to designate a substantially rectangular chassis frame. On the rear end of this frame 10 I support the same by two relatively small caster wheels 11 and 12. This rear end of the device is the hitch end and I have secured thereto a handle member 13 to facilitate the manual movement of the device over the roadway. Within the forward area of the frame, and longitudinally therewith I mount two spaced apart relatively weak leaf springs 15 and 16 as shown in Fig. 3. The rear ends of these two springs are supported by crossbar 17 on the rear portion of the frame 10, and the front ends of the springs are pivotally connected to the front end of the frame 10. These two springs are centrally located longitudinally within the frame as shown in Fig. 3, having their legs bowing downwardly and are relatively of sensitive character. The numeral 19 designates a horizontal wheel axle secured to and extending between the two springs 15 and 16. Rotatably mounted on the wheel 19 is a pneumatic tired wheel 20. At each side of the wheel 20 and secured to the frame 10 is an upwardly extending A-frame 21. These two A-frames extend to a plane substantially above the wheel 20 and are secured together at their tops by the crossbeam 22. At one side of the wheel 20 and operatively secured to its lower end to the spring 15, is a vertical rod 23 extending upwardly and slidably extending through the beam 22. The numeral 25 designates a similar rod operatively secured at its lower end to the spring 16, extending vertically upwardly and slidably extending through the beam 22 as shown in Fig. 6. By this construction whenever the springs 15 and 16 are flexed in either direction the rods 23 and 25 will slidably move in the beam 22. The numeral 26 designates a crossbar above the wheel 20, having one end slidably embracing the rod 23 and its other end slidably embracing the rod 25. The numeral 27 designates a vertically adjustable stop on each of the rods 23 and 25 and directly below the bar 26. The numeral 29 designates a vertically adjustable stop on each of the rods 23 and 25 and positioned above the crossbar 26 as shown in Fig. 6. The numeral 30 designates a coil spring embracing each of the rods 23 and 25. Each of these coil springs has its upper end engaging the underside of the beam 22 and its lower end engaging the stops 29, respectively. The numeral 31 designates adjusting nuts threaded onto each of the rods 23 and 25 and above the beam 22. The numeral 33 designates a bracket bearing rigidly secured to and extending downwardly from the beam 22. The numeral 34 designates a shaft rotatably mounted in the bracket bearing 33 and having a drum 35. The numeral 36 designates a cable having one end secured to the upper right side of the drum 35, extending downwardly and around the drum and then upwardly and with its other end secured to the center of the crossbar 26. To prevent the crossbar 26 from upward movement at times, I have provided a spring loaded toggle arm 37 on the beam 22 which may be moved to a lowered position toward the crossbar 26. When the crossbar 26 is to be effective, this toggle arm 37 is moved to an upward position as shown in Fig. 6. To dampen any violent action of the springs 15 and 16, I provide a shock absorber or dashpot at each side of the wheel 20. The numeral 39 designates the shaft of the shock absorber which is connected to the beam 22, and the numeral 40 designates a cylinder portion operatively pivotally connected to the lower end of the adjacent rod 23 or 25. By this construction whenever the wheel 20 moves upwardly relative to the frame 10, the rods 23 and 25 will be accordingly raised. The raising of these rods will also raise the crossbar 26 which will pull upwardly on the cable 36 and accordingly rotate the shaft 34 to the right. This shaft 34 extends rearwardly toward the instruments of the machine. The numeral 41 designates a bracket on the crossbar 17. The rear end of the shaft 34 rotatably extends through the forward end of this bracket 41, and has secured to its rear end a clutch face member 42 as shown in Fig. 4. The numeral 43 designates a coil spring embracing the rear end portion of the shaft 34 having one end engaging the forward side of the clutch member 42 and its other end engaging the bracket 41. This coil spring 43 urges the clutch member 42 and shaft 34 in a rear sliding position which is made possible by the drum 35 being slidably keyed onto the shaft 34. The numeral 45 designates a collar on the shaft 34 and forward of the bracket 41. The numeral 46 designates an arm pivoted to the bracket 41 and having a portion extending between the bracket 41 and collar 45. The numeral 47 designates a control rod having one end connected to one end of the arm 46 and its other end extending to the handle 13 as shown in Fig. 3. By this arrangement the clutch member 42 and shaft 34 may be moved forwardly and against the yielding action of the spring 43. The numeral 49 designates a rotatably mounted shaft on the bracket 41 having a clutch face member 50 to the rear of, and capable of being engaged by the clutch member 42 as shown in Fig. 4. The numeral 51 designates the sensing integrator and which is secured to the bracket 41. The shaft 49 extends into this instrument and is connected to the dial hand 52 as shown in Fig. 8. This hand 52 moves clockwise over the instrument dial 53 which is for one hundred feet calibrated at the rate in inches per mile. The integrator hand 52 only moves in a clockwise direction and this movement is intermittent in that the hand is only moved when the wheel 20 moves upwardly relative to the frame 10. If the hand 52 were to intermittently move to total one complete revolution over the dial 53, four inches of roughness of the surface would be indicated. Therefore, on the shaft 49 of the instrument I have provided a cam 55 having four spaced apart projections as shown in Fig. 8. The numeral 56 designates an angle arm having one end slidably engaging the cam 55 as shown in Fig. 8. The numeral 57 designates a supporting bracket on the crossbar 17 which supports a horizontal stub shaft 59. The numeral 60 designates a bar slidably mounted on the stub shaft 59 and having one end secured to the other end of the angle arm 56. This member 60 supports a writing instrument 61. The numeral 62 designates a coil spring having one end connected to the bracket 57 and its other end connected to the member 60 for yieldingly holding the member 60 to the right and the angle arm 56 in yielding engagement with the cam 55. The numeral 63 designates a rotatably mounted shaft in the bracket 57. Imposed in this shaft 63 is a yieldable clutch means 64. The numeral 65 designates a roller on the outer end of the shaft 63. The numeral 66 designates a bracket on the crossbar 17 rotatably supporting a roll of paper 67. The free end portion of this roll of paper extends over the roller 65 and is engaged by the writing instrument 61. By this arrangement of parts, and when the device is in operation the rotation of the shaft 63 will move the paper strip under the writing instrument and the line 69 made on the paper strip will be in a straight line except when the angle arm 56 moves across one of the projections of the cam 55. When this occurs, a hump will be formed on the line 69 to indicate one inch of roughness. By merely counting these variations in the line 69, over a given distance, the roughness in inches may be easily and quickly ascertained. The integrator 51 also has a dial 70 and pointer 71 to tabulate the accumulated inches of roughness, i.e., 12 inches, 24 inches, 36 inches and 48 inches. The numeral 72 designates an ordinary speedometer mounted on the instrument bracket. This speedometer is driven by a flexible shaft 73 that has one end connected to the speedometer and its other end rotatably mounted in a bracket 74 near the wheel 20. On this latter end of the flexible shaft is a roller wheel 75 that is in engagement with the wheel 20 as shown in Fig. 1. When the wheel 20 is rotated the speedometer shaft will also be rotated. The numeral 76 designates a pulley wheel on the rear end portion of the flexible shaft 73. The numeral 77 designates a flexible shaft having one end operatively connected to a pulley wheel 79 and its other end operatively connected to an ordinary distance tabulator 90 mounted on top of the integrator 51. The numeral 91 designates a gear box operatively connected to the shaft 63 and having an inlet shaft 92 carrying a pulley wheel 93. The numeral 95 designates an endless belt embracing the pulley wheels 76, 79 and 93. The numeral 96 designates a linkage connected to the arm 46 and operatively connected to the tabulator 90 so that when the clutch mechanism between the shaft 34 and integrator are disconnected, the tabulator 90 will also be disconnected. The numeral 97 designates an ordinary manual set button on the tabulator 90. The numeral 99 designates a manually operated set button on the integrator.

Besides showing and tabulating and recording of the accumulated inches of roughness in a given length of runway, it is also highly desirable to make a record of the roughness of the roadway as it is encountered. I will now describe this latter phase of the invention. The numeral 100 designates a bearing means operatively connected to the crossbar 17. Slidably mounted in this bracket means is a shaft 101. On the axle end of this shaft 101 is a writing instrument 102 having its effective end engaging and capable of writing onto the paper of the paper roll 67. The numeral 103 designates a stop on the shaft 101. The numeral 105 designates a coil spring embracing the shaft 101 having one end engaging the bearing means 100 and its other end engaging the stop 103 for yieldingly holding the writing instrument 102 laterally and to the left. The numeral 106 designates a drum secured on the shaft 34. The numeral 107 designates a flexible cable having one end connected to the drum 106 and its length extending up and down over the drum, and its other end operatively secured to the shaft 101. By this arrangement whenever the shaft 34 is rotated in one direction, it will rotate the drum 106 in a like direction thereby sliding the shaft 101 against the action of the spring 105 and cause the writing instrument 102 to make the irregular line 109 on the paper strip as the paper strip is moving across the roller 65. This line 109 will show and record the roughness of the roadway as it occurs. The numeral 110 designates a spiral spring having one end secured to the shaft 34 and its other end operatively secured to the crossbar 17. This spring 110 returns the shaft 34 to its original position after the shaft has been rotated in one direction by the cable 36.

Figure 9:
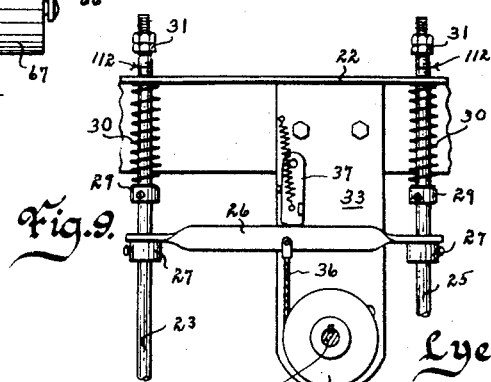
Fig. 9 is an enlarged cross sectional view of the parts of the machine located above the sensing wheel.

As herebefore indicated, adjustments are necessary prior to use in order to establish an operation reference point. To aid in the positioning and adjustment of the rods 23 and 25 I have provided scale markings 112 as shown in Fig. 9. Obviously, the speed with which the device moves over the roadway surface will affect the readings. The purpose, therefore, of the speedometer 72 is for the maintenance of a given speed. If my device is manually pushed over the roadway, I recommend that a speed of approximately three miles per hour be maintained. Once the factors have been established the device is most accurate in the measurement, recording and tabulation of the roughness of a roadway including its accumulated amount of roughness over a given distance. Herebefore in larger type machines, constant speed, tire pressure and the like were important factors but with my device one of the most important phases is the balancing of the entire unit so that it would be sensitive to road roughness. To get the proper results and take advantage of the phenomenon herebefore discussed, it is necessary that the hitch end of the unit be substantially spaced from the wheel axle, with the weight of the instruments and like approximately two-thirds distant back from the axle and about one-third distant from the hitch end of the device as shown in Fig. 1. If the weight of the instruments, brackets, and crossbar 17 are not sufficient to properly ballast the unit, ballast 115 may be placed onto the crossbar 17. Therefore it is important in order to place the instruments at the proper position on the frame 10 to use the elongated actuating shaft 34 as shown in Fig. 3. Also by having the speedometer at this rear location and at a substantial distance from the wheel 20 the elongated flexible speedometer shaft will extend for a considerable distance and thereby not seriously affect the relative movement of the wheel 20 in the frame 10 and which would otherwise be the case with a short speedometer shaft.

With the various instruments neutralized and after the desired travel speed has been obtained, the control rod 47 is pulled rearwardly thereby permitting engagement of the clutch part 42 and also releasing the distance recorder 90. The paper ribbon will pass under the two writing instruments 61 and 102 and the vertical movement of the wheel 20 relative to the frame 10 will cause the writing instruments to produce irregular lines on the paper such as shown in Fig. 2. By this arrangement of parts the hand 52 will indicate the accumulated inches in rate per mile, the line 69 will record and preserve each inch of roughness as it is accumulated, the hand 71 will correctly indicate the accumulated inches, and the line 109 will record and preserve the roughness of the roadway as it is encountered. The distance tabulator 90 will record the distance over which the device has operated. To keep the belt 95 in a taut condition, the pulley wheel 79 may be rotatably mounted on a pivoted arm and held in one direction by the coil spring 113. If an arm 116 is secured to the shaft 101 and placed forward of the clutch unit on the shaft 34 when the shaft 34 is moved forwardly to disengage it, the writing instrument 102 will be lifted from the paper ribbon. By this arrangement the writing instrument 102 will only function when the clutch is engaged. By providing the two rods 23 and 25 at each side of the wheel 20, respectively, and slidably mounting the bearing 26 with limitations on these rods, any canting of the wheel 20 caused by one side edge of its tread engaging a stone or like or by one of the wheels 11 or 12 engaging such an obstacle, the undesirable effect will be substantially neutralized and the wheel 20 will be yieldingly held in a proper vertical position.

Some changes may be made in the construction and arrangement of my method of and means for sensing and tabulating the accumulated roughness of a roadway surface without departing from the real spirit and purpose of my invention, and it is my intention to cover by my claims, any modified forms of structure or use of mechanical equivalents which may be reasonably included within their scope.

I claim:

1. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively engaging said two shafts, a drum on said rotatably mounted shaft, a cable secured to said drum and said crossbar, and a spring means for yieldingly holding said rotatably mounted shaft in one direction of its rotation; said paper ribbon, said means for moving said paper ribbon, said cam, said movable member engaging said cam, and said writing instrument being supported by said support means.

2. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively engaging said two shafts, a drum on said rotatably mounted shaft, a cable secured to said drum and said crossbar, and a spring means for yieldingly holding said rotatably mounted shaft in one direction of its rotation; said paper ribbon, said means for moving said paper ribbon, said cam, said movable member engaging said cam, and said writing instrument being supported by said support means.

3. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, and a spring means for yieldingly holding said rotatably mounted shaft in one direction of its rotation; said paper ribbon, said means for moving said paper ribbon; said cam, said movable member engaging said cam, and said writing instrument being supported by said support means.

4. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, a shaft slidably mounted on said support means, a second writing instrument on said last mentioned shaft and adapted to be in engagement with said paper ribbon, a spring means for yieldingly holding said last mentioned shaft in one direction of its sliding movement, a second drum on said first mentioned rotatably mounted shaft, a cable secured to said last mentioned drum and said shaft having said second writing instrument, and a spring means for yieldingly holding said rotatably mounted shaft in one direction of its rotation; said paper ribbon, said means for moving said paper ribbon, said cam, said movable member engaging said cam, and said writing instruments being supported by said support means.

5. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, a shaft slidably mounted on said support means, a second writing instrument on said last mentioned shaft and adapted to be in engagement with said paper ribbon, a spring means for yieldingly holding said last mentioned shaft in one direction of its sliding movement, a second drum on said first mentioned rotatably mounted shaft, a cable secured to said last mentioned drum and said shaft having said second writing instrument, a spring means for yieldingly holding said rotatably mounted shaft in one direction of its rotation; said paper ribbon, said means for moving said paper ribbon, said cam, said movable member engaging said cam, and said writing instruments being supported by said support means, and an integrator having a dial face and an indicator arm operatively associated with said cam.

6. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, a shaft slidably mounted on said support means, a second writing instrument on said last mentioned shaft and adapted to be in engagement with said paper ribbon, a spring means for yieldingly holding said last mentioned shaft in one direction of its sliding movement, a second drum on said first mentioned rotatably mounted shaft, a cable secured to said last mentioned drum and said shaft having said second writing instrument, a spring means for yieldingly holding said rotatably mounted shaft in one direction of its rotation; said paper ribbon, said means for moving said paper ribbon, said cam, said movable member engaging said cam, and said writing instruments being supported by said support means, a speedometer on said support means operatively connected to said wheel, and an integrator having a dial face and an indicator arm operatively associated with said cam.

7. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, a shaft slidably mounted on said support means, a second writing instrument on said last mentioned shaft and adapted to be in engagement with said paper ribbon, a spring means for yieldingly holding said last mentioned shaft in one direction of its sliding movement, a second drum on said first mentioned rotatably mounted shaft, a cable secured to said last mentioned drum and said shaft having said second writing instrument, a spring means for yieldingly holding said rotatably mounted shaft in one direction of its rotation; said paper ribbon, said means for moving said paper ribbon, said cam, said movable member engaging said cam, and said writing instruments being supported by said support means, a speedometer on said support means operatively connected to said wheel, a means for moving said paper ribbon operatively connected to said speedometer, and an integrator having a dial face and an indicator arm operatively associated with said cam.

8. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, a shaft slidably mounted on said support means, a second writing instrument on said last mentioned shaft and adapted to be in engagement with said paper ribbon, a spring means for yieldingly holding said last mentioned shaft in one direction of its sliding movement, a second drum on said first mentioned rotatably mounted shaft, a cable secured to said last mentioned drum and said shaft having said second writing instrument, a spring means for yieldingly holding said rotatably mounted shaft in one direction of its rotation; said paper ribbon, said means for moving said paper ribbon, said cam, said movable member engaging said cam, and said writing instruments being supported by said support means, a speedometer on said support means operatively connected to said wheel, a means for moving said paper ribbon operatively connected to said speedometer, an accumulated distance indicator operatively associated with said speedometer, and an integrator having a dial face and an indicator arm operatively associated with said cam.

9. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, a shaft slidably mounted on said support means, a second writing instrument on said last mentioned shaft and adapted to be in engagement with said paper ribbon, a spring means for yieldingly holding said last mentioned shaft in one direction of its sliding movement, a second drum on said first mentioned rotatably mounted shaft, a cable secured to said last mentioned drum and said shaft having said second writing instrument, a spring means for yieldingly holding said rotatably mounted shaft in one direction of its rotation; said paper ribbon, said means for moving said paper ribbon, said cam, said movable member engaging said cam, and said writing instruments being supported by said support means, a speedometer on said support means operatively connected to said wheel, a means for moving said paper ribbon operatively connected to said speedometer, an accumulated distance indicator operatively associated with said speedometer having a releasable clutch means imposed between said rotatably mounted shaft and said cam, and an integrator having a dial face and an indicator arm operatively associated with said cam.

10. In a device for recording the roughness of a surface, a frame, a means for supporting one end of said frame, a wheel axle, spring means on said frame rotatably supporting said axle, a wheel on said axle, a support means on said frame, a paper ribbon, a means operatively secured to said wheel for moving said paper ribbon, a shaft operatively rotatably mounted to said frame, a cam rotatable in only one direction operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively adjustably engaging said two shafts, a drum on said rotatably mounted shaft, a cable secured to said drum and said crossbar, a shaft slidably mounted on said support means, a second writing instrument on said last mentioned shaft and adapted to be in engagement with said paper ribbon, a spring means for yieldingly holding said last mentioned shaft in one direction of its sliding movement, a second drum on said first mentioned rotatably mounted shaft, a cable secured to said last mentioned drum and said shaft having said second writing instrument, a spring means for yieldingly holding said rotatably mounted shaft in one direction of its rotation; said paper ribbon, said means for moving said paper ribbon, said cam, said movable member engaging said cam, and said writing instruments being supported by said support means, a speedometer on said support means operatively connected to said wheel, a means for moving said paper ribbon operatively connected to said speedometer, an accumulated distance indicator operatively associated with said speedometer having a releasable clutch means imposed between said rotatably mounted shaft and said cam, shock absorber means operatively connected to said wheel axle and said frame, and an integrator having a dial face and an indicator arm operatively associated with said cam.

11. In a device for recording the roughness of a surface, a frame, a means for supporting one end of said frame, a wheel axle, spring means on said frame rotatably supporting said axle, a wheel on said axle, a support means on said frame located closer to the supported end of said frame than to said axle, a paper ribbon, a means operatively secured to said wheel for moving said paper ribbon, a shaft operatively rotatably mounted to said frame, a cam operatively secured to said shaft, a movable member in engagement with said cam, a writing instrument secured to said last mentioned member and in engagement with said paper ribbon, two shafts operatively secured to said axle and positioned at each side, respectively, of said wheel, a spring means associated with each of said shafts for yieldingly holding them in a lowered position, a crossbar operatively engaging said two shafts, a drum on said rotatably mounted shaft, a cable secured to said drum and said crossbar, and a spring means for yieldingly holding said rotatably mounted shaft in one direction of its rotation.

References Cited in the file of this patent

UNITED STATES PATENTS

| | | |
|---|---|---|
| 315,532 | Morris et al. | Apr. 14, 1885 |
| 824,536 | Ellis et al. | June 26, 1906 |
| 1,264,495 | Dunbar | Apr. 30, 1918 |
| 1,884,193 | Perry | Oct. 25, 1932 |

FOREIGN PATENTS

| | | |
|---|---|---|
| 56,289 | Denmark | May 30, 1939 |